(12) United States Patent
Torres

(10) Patent No.: US 6,335,818 B1
(45) Date of Patent: * Jan. 1, 2002

(54) BICHROMAL BEADS HAVING ELECTROLYTES THEREIN

(75) Inventor: Francisco E. Torres, San Jose, CA (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/427,346

(22) Filed: Oct. 26, 1999

(51) Int. Cl.⁷ .......................... G02B 26/00; B32B 15/02
(52) U.S. Cl. .................. 359/296; 428/402.21; 428/407; 523/207; 523/210; 345/107; 345/85
(58) Field of Search .................. 345/107, 85; 428/323, 428/327, 402.21, 407; 264/4.7, 343; 427/213.3, 213.31, 213.34, 213.36; 523/207, 210; 359/296; 349/86

(56) References Cited

U.S. PATENT DOCUMENTS

| | | | |
|---|---|---|---|
| 4,126,854 A | 11/1978 | Sheridon | 345/107 |
| 4,143,103 A | 3/1979 | Sheridon | 264/4 |
| 4,261,653 A | 4/1981 | Goodrich | 359/296 |
| 4,438,160 A | 3/1984 | Ishikawa et al. | 427/214 |
| 4,810,431 A | 3/1989 | Leidner | 264/15 |
| 5,262,098 A | 11/1993 | Crowley et al. | 264/8 |
| 5,389,945 A | 2/1995 | Sheridon | 345/85 |
| 5,460,905 A | 10/1995 | Skotheim | 429/213 |
| 5,462,566 A | 10/1995 | Skotheim | 29/623.1 |
| 5,463,492 A | 10/1995 | Joseph A. Check, III | 359/296 |
| 5,538,812 A | 7/1996 | Lee et al. | 429/192 |
| 5,601,947 A | 2/1997 | Skotheim et al. | 429/213 |
| 5,648,187 A | 7/1997 | Skotheim | 429/213 |
| 5,690,702 A | 11/1997 | Skotheim et al. | 29/623.1 |
| 5,716,421 A | 2/1998 | Pendalwar et al. | 29/623.2 |
| 5,772,934 A | 6/1998 | MacFadden | 264/42 |
| 5,773,166 A | 6/1998 | Matsui et al. | 429/212 |
| 5,900,858 A | 5/1999 | Richley | 345/107 |
| 5,989,629 A | * 11/1999 | Sacripante et al. | 427/180 |
| 6,017,584 A | * 1/2000 | Albert et al. | 427/213.3 |
| 6,025,111 A | 2/2000 | Brian A. Schell | 430/212 |

FOREIGN PATENT DOCUMENTS

| | | |
|---|---|---|
| EP | 0721176 A2 | 3/1996 |
| EP | 0 821 368 A2 | 1/1998 |
| EP | 0928681 A1 | 4/1999 |
| JP | 63-94501 A * | 4/1988 |
| JP | 63-221188 A * | 9/1988 |
| JP | 3-139552 A * | 6/1991 |
| JP | 3-196407 A * | 8/1991 |
| JP | 3-238704 A * | 10/1991 |
| JP | 7-37419 A * | 2/1995 |
| JP | 8-27344 A * | 1/1996 |
| JP | 8-165395 A * | 6/1996 |
| WO | WO 96/39725 | 12/1996 |
| WO | WO 97/44840 | 11/1997 |
| WO | WO 97/48145 | 12/1997 |

OTHER PUBLICATIONS

"Polymer Electrolytes" by Michel B. Armand, Ann. Rev. Mater. SCi. 1986, pp. 245–261.

* cited by examiner

*Primary Examiner*—Evelyn A Lester
(74) *Attorney, Agent, or Firm*—Annette L. Bade

(57) ABSTRACT

A display media and display apparatus with a substrate, and bichromal beads having an electrolyte and a polymer, wherein the bichromal beads are dispersed or contained in the substrate are set forth.

27 Claims, 1 Drawing Sheet

BICHROMAL BEADS HAVING ELECTROLYTES THEREIN

CROSS REFERENCE TO RELATED APPLICATIONS

The following copending applications, application Ser. No. 09/427,411, filed Oct. 26, 1999, entitled "Bichromal Beads Having Polymers Therein," and U.S. application Ser. No. 09/427,656, filed Oct. 26, 1999, entitled "Bichromal Beads Having Crystalline Materials Therein;" are assigned to the same assignee of the present application. The entire disclosures of these copending applications are totally incorporated herein by reference in their entirety.

BACKGROUND OF THE INVENTION

This invention generally relates to display media, and the preparation of display media, and to devices using such display media. In particular, this invention relates to display media and displays for which the image remains in view after the field and/or power used to form the image is eliminated (completely reduced to zero), or reduced (decreased to a level below normally required to form the image). The image is formed by switching materials in the pixels between two states (such as, for example, black and white). In embodiments, the display media comprise bichromal beads, and in preferred embodiments, Gyricon beads. In embodiments, the bichromal beads comprise electrolytes dispersed or contained therein. In embodiments, the electrolytes are polymer electrolytes. The display media made with Gyricon beads are useful in generating images which can be stored or erased, and function by rotating a bichromal sphere by an external field to create the image.

Display media, such as Electric Paper or twisted ball panel display devices, are known and are described, for example, in U.S. Pat. Nos. 4,126,854; 4,143,103; 4,261,653; 4,438,160; 5,389,945. The media generally are comprised of a substrate material, for example, an elastomer, such as a cured polysiloxane, sandwiched between two indium tin oxide coated substrates, such as glass or MYLAR™. Generally, the elastomer layer has closely packed cavities, each containing a bichromal sphere suspended in a dielectric liquid. The dielectric liquid may also be present in substantial amounts in the elastomer matrix. In media that are active in an electric field, the bichromal spheres have a net dipole due to different levels of charge on the two sides of the sphere. An image is formed by the application of an electric field to each pixel of the display, which rotates the bichromal spheres to expose one color or the other to the viewing surface of the media. The spheres may also have a net charge, in which case they will translate in the electric field as well as rotate. When the electric field is reduced or eliminated, the spheres ideally do not rotate further; hence, both colors of the image remain intact. This image bistability is one feature of display media made with bichromal Gyricon beads.

The fabrication of certain bichromal spheres is known, for example, as set forth in the above mentioned U.S. Pat. No. 4,143,103, wherein the sphere is comprised of black polyethylene with a light reflective material, for example, titanium oxide, sputtered on hemisphere. Also in U.S. Pat. No. 4,438,160, a rotary ball is prepared by coating white glass balls of about 50 microns in diameter, with an inorganic coloring layer such as indium by evaporation. In a similar process, there is disclosed in an article entitled "The Gyricon—A twisting Ball Display", published in the proceedings of the S.I.D., Vol. 18/3 and 4 (1977), a method for fabricating bichromal balls by first heavily loading glass balls with a white pigment such as titanium oxide, followed by coating from one direction in a vacuum evaporation chamber with a dense layer of nonconductive black material which coats only one hemisphere.

Also in U.S. Pat. No. 4,810,431 by Leidner, there is disclosed a process for generating spherical particles by (a) coextruding a fiber of a semi-circular layer of a polyethylene pigmented white and a semi-circular black layer of polyethylene containing magnetite, (b) chopping the resultant fiber into fine particles ranging from 10 microns to about 10 millimeters, (c) mixing the particles with clay or anti-agglomeration materials, and (d) heating the mixture with a liquid at about 120° C. to spherodize the particles, followed by cooling to allow for solidification.

Reference is made to U.S. Pat. No. 5,262,098, and in co-pending patent applications Ser. No. 09/360,088, filed Jul. 23, 1999, entitled "Method and Apparatus for Fabricating Bichromal Elements", and Ser. No. 09/360,052, filed Jul. 23, 1999, entitled "Method and Apparatus for Fabricating Bichromal Elements." These applications disclose apparatuses for fabricating hemispherically bichromal balls comprising a separator member having opposing first and second surfaces and an edge region in contact with both surfaces, and delivery means for flowing first and second colored hardenable liquid material over the first and second surfaces, respectively, so that the liquid materials arrive at the edge, usually at substantially the same flow rate, and form a reservoir outboard of the edge region. The reservoir comprises side-by-side regions of different colors, which in a preferred embodiment, do not intermix. Further means are provided for propelling the first and second liquid materials away from the separator member and out of the reservoir into a fluid medium. As this occurs, a plurality of forward ends of side-by-side bichromal streams become unstable and break up into droplets. The droplets form into spherical balls, each of the balls approximately comprising hemispheres of differently colored hardenable liquids. These bichromal balls are from about 5 to about 200 microns in diameter.

The aforementioned display media can suffer from drawbacks caused by incomplete rotation of the bichromal beads. When the beads do not rotate close to 180°, the switching from one color to the other is not complete. As a result, image quality suffers. In some cases, increasing the strength of the electric field used to rotate the spheres can help in achieving more complete rotation, but in other cases sufficient rotation cannot be attained, even at higher fields. In the latter cases, it is believed that the dipole strength of the sphere relative to the monopole strength is too small, rendering it difficult to get sufficient rotation before the sphere translates across its cavity in the elastomer matrix. Many of the beads may even lack sufficient monopole and dipole strengths to dislodge them from the cavity walls. Furthermore, it is usually preferable to produce media requiring an electric field that is not too high in magnitude, since the cost, robustness, and power consumption of display products made from media that switch at lower electric fields can be advantaged.

Another drawback of the aforementioned display media is the lack of a sharp voltage threshold. Consider a media that requires a voltage ±V to get sufficient sphere rotation and hence switching between colors. There is a sharp voltage threshold above a magnitude of ½V when the spheres do not rotate at voltages of magnitudes less than or equal to ½V. During the course of writing an image on a media with a sharp voltage threshold above a magnitude of ½V, pixels that experience voltages between $-\frac{1}{2}V$ and $+\frac{1}{2}V$ will not change their color. For certain applications this property is desired. An example application is a display device with passive matrix addressing. In the case of passive matrix addressing, a pixel of the display is addressed by applying half of the required voltage to both the row and column of that pixel, the two half voltages having opposite polarities to yield a total voltage across the pixel equal to the switching voltage of $\pm V$. At the same time, however, other pixels in the same row but in other columns, or in the same column but in other rows, experience a voltage of $\pm\frac{1}{2}V$. Thus, it is desired that the spheres in those pixels do not rotate at the voltage $\pm\frac{1}{2}V$. A sharp voltage threshold above $\pm\frac{1}{2}V$ gives the desired behavior, whereas a media that lacks a sharp voltage threshold does not. Since the display media described in the above paragraphs may not have a sharp voltage threshold at or above $\pm\frac{1}{2}V$ when made using bichromal spheres according to the examples and formulations disclosed in the prior art, passive matrix addressing on such media results in poor image quality due to rotation of spheres at voltages in the range of $-\frac{1}{2}V$ to $+\frac{1}{2}V$.

Materials that can improve the rotational behavior of bichromal beads could enable display media to be used in a wider variety of applications than is currently possible. For example, materials that provide a more reproducible and lower voltage for rotation and a sharper voltage threshold above one-half of the voltage used for rotation, could be used to make bichromal passive matrix displays a reality. Therefore, it is desired to provide a display media wherein a threshold voltage exists that is larger than one-half of the voltage used for rotation. It is further desired to provide a display media wherein the threshold voltage is sharper to eliminate most, or ideally all, of the rotation below the threshold voltage and more complete rotation can be obtained at a lower applied voltage.

The present invention provides, in embodiments, for bichromal sphere formulations that include electrolyte materials in order to help achieve lower switching voltages, faster and more complete rotation of beads, and more distinct voltage thresholds for displays and display media containing bichromal beads, and in particular, Gyricon beads.

SUMMARY OF THE INVENTION

Embodiments of the present invention include: a display media comprising a) a substrate, and b) bichromal beads comprising an electrolyte and a polymer, wherein the bichromal beads are dispersed in the substrate.

Embodiments also include: a display media comprising a) a substrate, and b) bichromal beads comprising an alkyl poly(alkylene oxide) and a lithium salt, wherein said bichromal beads are dispersed in said substrate.

Embodiments further include: a display apparatus capable of causing an image to be displayed on a display media comprising: a display media comprising a) a substrate, and b) bichromal beads comprising an electrolyte and a polymer, wherein said bichromal beads are dispersed in said substrate; and a means for orienting said bichromal beads in said substrate so as to form an image on said display media.

DETAILED DESCRIPTION OF THE INVENTION

The present invention relates to twisting ball display media containing bichromal beads or balls. The display media comprises a media which, in embodiments, has many attributes of a paper document. For example, in embodiments, the media may look like paper, have ambient light behavior like paper, be flexible like paper, be carried around like paper, be copied like paper, and have nearly the archival memory of paper.

Figure 1:
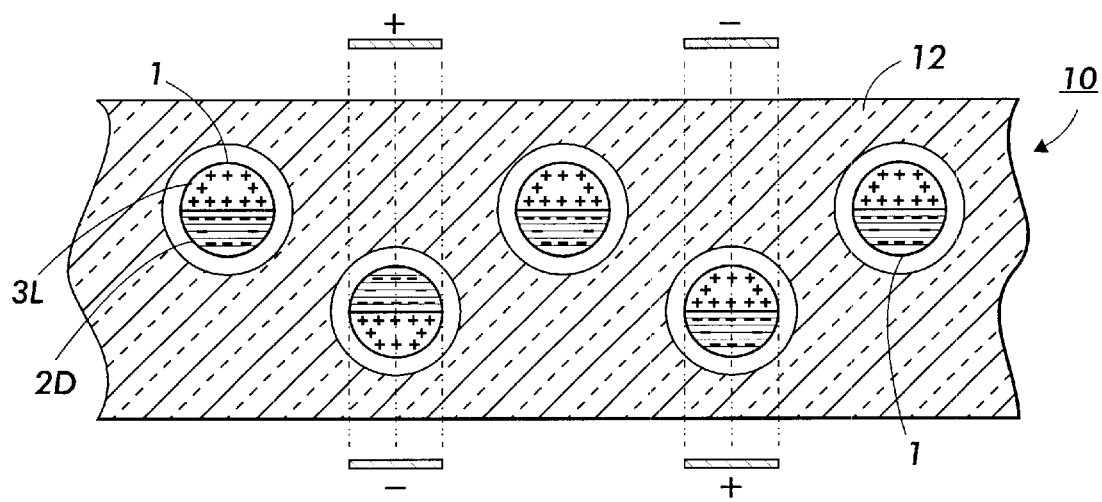
FIG. 1 is a cross-sectional view of a portion of a display media.
Figure 2:
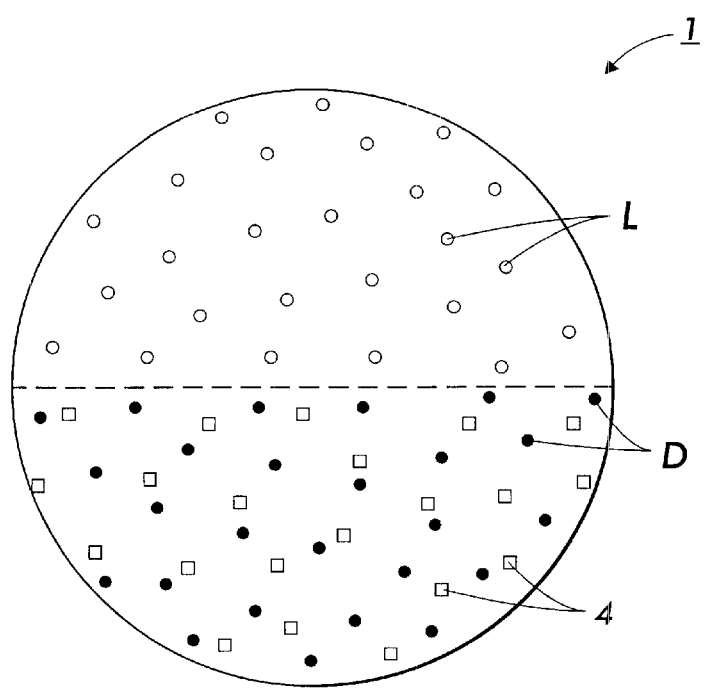
FIG. 2 is an enlarged, cross-sectional view of an embodiment of a display media showing two hemispheres.

Referring to FIG. 1, there is shown a cross sectional view of a portion of a display media 10 comprising a plurality of bichromal beads 1 which have a darker pigmented hemisphere 2D on one side and a lighter hemisphere 3L on the other side. FIG. 2 is an enlarged view of the bichromal beads 1 and depicts lighter pigments L dispersed or contained in the base material of the upper hemisphere (corresponding to hemisphere 3L in FIG. 1), and depicts darker pigments D dispersed or contained in the base material of the lower hemisphere (corresponding to hemisphere 2D in FIG. 1). The display media 12 can be any media capable of displaying an image, such as a sheet, and may comprise any suitable material for housing the bichromal beads such as, for example, an elastomer material.

As shown in FIG. 1, each of the hemispheres 3L and 2D contain electrical charges. The electrical charges on each hemisphere are generated via an external potential. These charges may be of the same or of opposite signs, and they may be present always or only when the electrical field is applied to the media.

The display media described herein can be used in a display apparatus or device for the purpose of causing an image to be formed on the display media. In general, bichromal spheres are dispersed or contained in a substrate. In optional embodiments, the beads may be microencapsulated. In this case, the beads may still be dispersed or contained in a substrate, but they may also be, e.g., painted or brushed onto surfaces, or the like. The bichromal spheres of the present invention which comprise hemispheres of different colors and different amounts of electrostatic or electrodynamic charge are useful as a flexible "electric paper" display media. The present invention is generally directed to a display media, or a rotary twisted ball, electric paper or a Gyricon display media, comprised of bichromal spheres or Gyricon beads. The flexible display media, under the action of an external electric field, allows the bichromal spheres to rotate in accordance with their electrical anisotropy within the substrate to provide an image.

In preferred embodiments, the bichromal spheres are black on one side and white on the other side. Preferred bichromal spheres consist of white pigment titanium dioxide dispersed in a base material on one side of the bead, and a black pigment dispersed in a base material on the other side of the bead.

The bichromal spheres are relatively small, for example from about 2 to about 200 microns in diameter, and preferably from about 30 to about 120 microns in diameter, volume average throughout.

The bichromal spheres are also preferably fabricated by the processes as disclosed in U.S. Pat. No. 5,262,098, or as disclosed in copending applications Ser. No. 09/360,088, filed Jul. 23, 1999, entitled "Method and Apparatus for Fabricating Bichromal Elements," and Ser. No. 09/360,052, filed Jul. 23, 1999, entitled "Method and Apparatus for Fabricating Bichromal Elements." Alternatively, other known methods for the preparation of bichromal spheres can be practiced, such as disclosed in U.S. Pat. No. 4,126,854. The disclosure of each of these references is hereby incorporated by reference in their entirety.

Generally, the polymer electrolyte functionality provides a mechanism whereby charge can migrate, allowing a charge distribution to form within the bichromal bead.

Bichromal beads have both monopole and dipole charge components. The monopole charge is simply the net charge on the bead, expressed as proportional to Q(1)+Q(2), where Q(1) and Q(2) is the total charge on the lighter side of the bead and Q(2) is the total charge on the darker side of the bead. If Q(1) and Q(2) were equal and opposite polarity charges, the monopole charge would be zero. Typically, they have the same polarity.

The monopole charge is responsible for causing the bead to move from one cavity wall position to the opposite position, upon application of an electric field. Without this charge, the bead would remain locked to the cavity wall and rotation would be very difficult.

The dipole moment causes the bead to rotate as it moves across the oil-filled cavity. The force causing this rotation is proportional to the dipole moment, which itself is proportional to 0(1)–Q(2).

In a well operating display, the application of a suitable electric field will cause the bead to move across the oil filled cavity, rotating as it moves. By the time it reaches the opposite section of the cavity wall, its rotation of 180 degrees must be complete. Over rotation due to the angular momentum of the bead does not occur in this regime of hydrodynamics. This means that strong monopoles and strong dipoles are desirable, as well as the proper balance between them.

The electrolyte appears to augment the monopole and dipole charge distributions on the bichromal bead.

The bichromal elements, or spheres or beads, preferably comprise electrolyte components in one or both hemispheres. The presence of the electrolyte improves the bichromal bead behavior in an electric field by contributing to a lower switching voltage, faster rotation, and/or a more distinct voltage threshold for displays and display media containing the bichromal beads, an example being Gyricon beads. In principle, any liquid, solid, or solid-like material capable of storing and transporting ions may be used. Illustrative of useful electrolyte materials are electrolyte materials that are chemically and electrochemically inert and that perform under a wide range of operating temperatures, preferably from –10° C. or lower to 50° C. or higher.

In embodiments, the bichromal beads preferably comprise a highly crystalline polyethylene with a sharp melting point (such as Polywax® 1000 from Baker-Petrolite), or other materials with similar properties, as the base material. In this invention, it is necessary to disperse the electrolyte into the base material, but simple electrolyte salts may not dissolve in such materials. In embodiments, the electrolyte is dispersed in the base material by adding polymer that has groups which interact favorably with the electrolyte ions. In embodiments, the aforementioned polymer may also contain groups which interact favorably with the base material and therefore aid in the dispersion of the electrolyte within the bichromal beads.

Examples of polymers suitable for use with electrolytes include polymers such as polyethers (an example being poly(ethylene oxide)-based materials); polyimides; sulfonated polyimides; polyphosphazenes; polyacrylonitriles (PAN); polysiloxanes; polyether grafted polysiloxanes; blends of the foregoing; derivatives of the foregoing; copolymers of the foregoing; crosslinked and network structures of the foregoing; blends, derivatives, copolymers, and crosslinked or network structures of the foregoing, and the like. Particularly preferred polymers are polymers comprised of polyether, polyphosphazene, polyacrylonitrile (PAN), polysiloxane, or/and polyether grafted polysiloxane groups, together with functionality that aids in the dispersion of the polymer in the bichromal spheres by providing compatibility with the base material. In an alternative embodiment, either the anion or cation of the salt may be covalently attached to the polymer component. In another alternative embodiment, there may also be added a low molecular weight liquid which effectively acts as a plasticizer for the salt-polymer complex, forming what is sometimes called a gel-polymer electrolyte material (see, e.g., U.S. Pat. No. 5,601,947). As is stated in U.S. Pat. No. 5,601,947, "these low molecular weight liquids are referred to as gelatin agents and are generally common organic solvents or liquid oligomers." Any organic liquid that is miscible with the salt-polymer matrix can be used as a gelatin agent, provided it is stable in the bichromal sphere during operation.

In an embodiment, the polymer of the polymer electrolyte material in the bichromal beads can be an ionomer, and in particular a proton-conducting polyelectrolyte, an example being fluorocarbon polymers with covalently bonded sulfonic acid groups, such as NAFION® materials. As an option, these ionomers can be used with plasticizers, an example being water.

In an embodiment, the electrolyte material can be a polyelectrolyte together with its counterions.

In an embodiment, the electrolyte functionality can be incorporated into the pigments or colorants in one or both halves of the bichromal beads, or pigments or colorants that inherently comprise electrolyte functionality can be incorporated into one or both halves of the bichromal beads.

Preferably, the bichromal spheres or beads comprise an electrolyte and a polymer having polyether functionality. Particularly preferred polymers include alkyl poly(alkylene oxide) such as alkyl poly(alkylene oxide) acetate ester, alkyl poly(alkylene oxide) alcohol, or the like. In an embodiment, the alkyl can be methyl, ethyl, propyl, butyl, and the like; poly(methyl), poly(ethyl), poly(propyl), poly(butyl), and the like; poly(ethylene), poly(propylene), poly(butylene), and like alkyls. In an embodiment, the poly(alkylene oxide) can be substituted or unsubstituted poly(methylene oxide), poly(ethylene oxide), poly(propylene oxide), poly(butylene oxide), and the like poly(alkylene oxide) functionalities. In a particularly preferred embodiment, the poly(alkylene oxide) is poly(ethylene oxide). In another particularly preferred embodiment, the alkyl poly(alkylene oxide) compound is poly(ethylene)-b-poly(ethylene oxide) acetate ester, which is available commercially from Baker-Petrolite as X-5173, X-5174, X-5175, or X-5345. It is preferred that the alkyl poly(alkylene oxide) compound have at least 4, and preferably from about 20 to about 100 alkylene oxide units per molecule. Preferably, the ethoxylates having the highest ethylene oxide levels are use.

Preferably, the polymer is present in the bichromal beads in an amount of from about 0.1 to about 50 weight percent, and preferably from about 1 to about 5 weight percent, based on the total weight of solids, which includes the weight of the base material and pigment or dye. Preferably the pigment or dye is present in an amount of from about 1 to about 70 weight percent.

Commercially available examples of polymers include those from Baker/Petrolite such as UNITHOX® products and derivatives UNITHOX® such as X-5175 (acetate, $E_{13-7}$ $EO_{30-50}$), X-5126 (phosphate ester, $(E_{16.7}EO_{42})$), X-5142 (acrylate ester, $E_{16.7}EO_{42}$), X-5208 (phosphate ester, $E_{24}EO_{17}$), X-5152 (sulfate ester, $E_{24}$, $EO_{17}$), X-5119 (phosphate ester $(E_{16.7}EO_{42})$, and the like. Note that "EO"

refers to the number of ethylene oxide units in the poly (ethylene oxide) block in a molecule on average, and "E" refers to the number of ethyl groups in the polyethylene block, on average. Such commercially available UNITHOX® polymer ethoxylates are preferably present at levels ranging from about 0.1 to about 8 percent, and particularly preferred of from about 0.2 to about 5 percent by total weight of the pigmented dispersion, and preferably in the black or dark pigmented dispersion. Other commercially available polymers include POLYOX® N-10 (ethylene oxide and fumed silica). This commercially available polymer ethoxylate is preferably present in an amount of from about 0.1 to about 8 percent, and preferably from about 0.2 to about 3 percent by total weight of the pigmented dispersion. Another commercially available polymer includes UNITHOX® 750, which is preferably present in an amount of from about 0.01 to about 3 percent, preferably from about 0.1 to about 0.5 percent by total weight of the pigmented dispersion. In addition, a preferred commercially available polymer is TWEEN® 61 (polyoxyethylene sorbitan monostearate), which is preferably present in an amount of from about 0.1 to about 5 percent, preferably from about 0.5 to about 1 percent by total weight of the pigmented dispersion.

In a preferred embodiment, an electrolyte salt is present in the bichromal beads in addition to the polymer material. The electrolyte salt can be any ionic substance capable of providing ionic conductivity, either when the bichromal sphere is produced and therefore molten or when it is in use in the display media, or both. Examples of useful electrolyte salts include salts of anions such as $BF_4^-$, $AsF_6^-$, $SCN^-$, $BPh_4^-$, $PF_6^-$, $[(CF_3SO_2)_2CH]^-$, (see Gray, 1997, Polymer Electrolytes, Royal Society of Chemistry, pp. 47–49 for a discussion of such anions), $CF_3SO_3^{-1}$, $ClO_4^{-1}$, $[N(CF_3SO_2)_2]^{-1}$, and $[N(CF_3CF_2SO_2)_2]^{-1}$, $SO_3CH_3^-$, and $[C(SO_2CF_3)]$, or other anions that dissociate in the alkyl poly(alkylene oxide) domains. Further examples include salts with either the cations or anions covalently bonded to polymer dispersed in the bichromal beads. Additionally, examples of useful electrolyte salts include salts of alkaline earth metals, transition metals, lanthanides, or rare earth metals, since polyalkylene oxides such as polyethylene oxide can solvate such metal cations (Gray, 1997, Polymer Electrolytes, Royal Society of Chemistry). Examples of useful salts include salts that can also act as colorants.

Further examples of preferred electrolyte salts include metal salts, wherein the metal can be any metal, but is preferably a metal from Group 1A of the Periodic table such as Li, Na, K, Rb, Cs, or the like. Other preferred cations include hard cations such as $Mg^{2+}$, $Ca^{2+}$. Preferred anions include $CF_3SO_3^{-1}$, $ClO_4^{-1}$, $[N(CF_3SO_2)_2]^{-1}$, and $[N(CF_3CF_2SO_2)_2]^{-1}$. Preferably, the metal salt is a lithium salt. Particularly preferred lithium salts include $LiClO_4$, $LiCF_3SO_3$, $LiN(CF_3SO_2)_2$, and $LiN(CF_3CF_2SO_2)_2$.

The electrolyte is present in the bichromal beads in an amount of from about 1:100 to about 1:3, and preferably from about 1:15 to about 1:6 molar ratio of electrolyte salt to alkylene oxide units. Based on the weight of total solids, the electrolyte salt is present in the bichromal beads in an amount of from about 0.0005 to about 90 weight percent.

A particularly preferred combination of alkyl poly (alkylene oxide) and electrolyte salt is $LiClO_4 \cdot 3H_2O$ plus an alkyl poly(ethylene oxide) having from about 30 to about 50 ethylene oxide units per molecule (available commercially as X-5175 available from Baker-Petrolite in the form of alkyl poly(ethylene oxide) acetate ester).

The combination of polymer, such as a polymer having polyether functionality, and electrolyte salt forms a polymer electrolyte. The electrolyte salt is partially or totally soluble in the polymer, thereby forming a material in which ions conduct. Depending on the particular choice of the components, the ionic conductivity can be from mobility of the cation, the anion, or both. Various types of polymers and electrolytes can be chosen. The incorporation of conductive polymer-based materials into one side of a bichromal bead provides a source of stronger dipole strength and more electrostatic contrast with the other hemisphere of the bead than would otherwise exist. Preferably, the polymer electrolyte is added to the black and white beads when the white side is comprised of $TiO_2$, although it can be added to any side, or to both sides. In another embodiment, the polymer electrolyte is added to the black side of the bichromal sphere.

Turning to FIG. 2, a preferred embodiment is demonstrated, wherein polymer electrolytes 4 are dispersed or contained in the hemisphere 2D containing the darker pigment D.

The polymer is used to obtain both electrolyte behavior in combination with the electrolyte salt, and dispersion of the electrolyte in the base material that makes up the majority of the bichromal bead. For bichromal beads made from polyethylene, the poly(ethylene) part of the poly(ethylene)-b-poly(alkylene oxide) is compatible with the polyethylene. The poly(alkylene oxide) is the polar part of the molecule that complexes with the electrolyte salt.

To incorporate the electrolyte components, they can be added during the dispersion of a pigment into a base material. Next, the bichromal bead is made using this base material and pigmented material of another color.

In embodiments, the beads comprise a polymer or wax as a base material. Examples of suitable base materials include a low melting hydrocarbon wax, preferably with a melting point of from about 50 to about 180° C., and more specifically from about 80 to about 130° C. Further, it is preferred that the hydrocarbon have a carbon content of from about 18 to about 1,000, and more specifically from about 50 to about 200 carbon atoms. A preferred wax is Polywax 1000 from Baker Petrolite Corporation. Other examples of suitable waxes include Carnuba wax and Candelia wax.

In embodiments, a pigment is used. Preferably, the darker pigment in the darker hemisphere 2D is a manganese ferrite or carbon black, although other suitable pigments can be used such as modified carbon blacks, magnetites, ferrites, and color pigments. In an embodiment wherein a black pigment is used, a preferred black pigment is 6331 from Ferro Corporation. In an embodiment wherein a lighter or white pigment is used in the lighter hemisphere 3L, a preferred white pigment is DuPont R104 $TiO_2$ pigment.

In embodiments, the bichromal beads may comprise small molecule plasticizers that serve to increase the mobility of the ions. Examples of such small molecule plasticizers include ethylene carbonate, propylene carbonate, N-methyl acetamide, acetonitrile, sulfolane, 1,2-dimethoxyethane, polyethylene glycols, 1,3-dioxolanes, glymes, siloxanes, water, and alcohols such as ethanol, methanol, isopropanol, n-propanol, butanol, and the like.

The bichromal beads are dispersed or contained in a substrate. Preferably, the substrate comprises an elastomer material. Specific examples of preferred elastomer materials include polysiloxanes, such as Sylgard 184. Examples of suitable elastomer materials are included in U.S. Pat. No. 4,126,854, the disclosure of which is incorporated herein in its entirety.

Preferably, the substrate comprises a liquid material for the purpose of providing liquid-filled cavities for each bichromal bead in which the bead can rotate relatively freely. Without any fluid around the bead, the bead is tightly held in the elastomer and cannot rotate, since there is no gap between the bead and the elastomer. Preferred liquid materials include oils such as Isopar oils or silicone oils, for example, Dow Corning 200 silicone oil, 10cS or less. Preferably, the substrate is swelled in the oil. Reference is made to U.S. Pat. No. 4,126,854 which discusses oils and how an elastomer is swelled in oil.

In embodiments, the substrate comprising the bichromal beads dispersed or contained therein, is sandwiched between two outer substrates which, in total, comprise the display media. The outer substrates are typically glass or plastic sheets that comprise indium tin oxide coatings on their inner surfaces. These coatings may be subdivided or patterned to allow application of the desired electric field at each area or pixel in the display.

All the patents and applications referred to herein are hereby specifically and totally incorporated herein by reference in their entirety in the instant specification.

The following Examples further define and describe embodiments of the present invention. Unless otherwise indicated, all parts and percentages are by weight.

EXAMPLES

Example 1

Preparation of Black pigmented waxes both with and without Lithium salt as Electrolyte A black pigmented wax was made by dispersing 50 g of F-6331 pigment (Ferro Corp.), 5.75 g of X-5175 (Baker-Petrolite), and 0.575 g of $LiClO_4.3H_2O$ (Aldrich) into 200 g of Polywax 1000 (Baker-Petrolite). This wax (PW512) and a white wax consisting of 20% $TiO_2$ (PW513) were used to make bichromal balls. The balls were sieved into fractions, and the 90–106 micron fraction was used to make an elastomer sheet. The sheet was made by mixing 5.00 g of SYLGARD 184 base, 0.75 g SYLGARD 184 curing agent, and 5.75 g of the 90–106 micron balls; placing the mixture under vacuum to de-aerate; casting the mixture into a 0.012 inch sheet; and curing at 90° C. for 2 hours. After curing, small subsheets were cut out and soaked in ISOPAR-L with anhydrous calcium sulfate overnight.

The above procedure was repeated without using $LiClO_4.3H_2O$.

The subsheets were made into displays by mounting between two glass plates coated with indium tin oxide in order to test the soaked subsheets. The surface of the glass plates with the indium tin oxide coating was placed on the inside adjacent to the subsheet. In the final test display, the components from one side to the other are glass, ITO coating, soaked subsheet, ITO coating on glass plate #2, glass plate #2.

When the diplays made from the soaked subsheets with $LiClO_4.3H_2O$ were tested, it was observed by eye that greater than 98% of the particles rotated greater than 160 degrees with an applied voltage of ±50V. There were few balls stuck to the elastomer.

For comparison, diplays made from sheets made without the $LiClO_4.3H_2O$ did not give a good response, even at ±100V. Addition of 6.75 g more of X-5175 to the formulation for the black pigmented wax was necessary to obtain acceptable behavior. In past testing, F-6331/$TiO_2$ Gyricon materials prepared without electrolyte have not shown a response at ±50V as good as for this example, demonstrating that the addition of an electrolyte to the black side of the bichromal balls can lower the threshold voltage for rotation.

Example 2

Testing Threshold Voltage of Beads

The beads of Example 1 also demonstrated a rather sharp threshold voltage, which is an important property for passively addressed displays. To demonstrate, a display comprising electrolyte was made from a sheet that had been soaked in ISOPAR-L overnight. Then the display was tested to determine how high the voltage had to be to change from white to black and from black to white.

Test 1: A –100 V voltage was applied to make the display white: brightness=13.1. Next, a square wave voltage of ±18V (6-second period) was applied for 10 periods. The brightness lowered from 13.1 to 12.1 after 10 cycles, which is not much of a drop. Basically, the brightness remained near the maximum for this sheet display.

Next, the voltage amplitude was changed to 37.5 V. The display showed an almost full-range black/white response, the display being white when the voltage was –37.5 V and black when the voltage was +37.5 V. At –37.5 V, the brightness varied between 11.2 and 12.1, and at +37.5 V, the brightness dropped to 3.4 to 3.5 for each cycle after 4 cycles.

Thus, there is a sharp change from almost no response of the balls to a good response when the amplitude of the applied voltage is doubled from 18.8 V to 37.5 V. This type of behavior, which we refer to as a sharp voltage threshold, is important for certain display applications, such as passively addressed displays.

Next, the voltage amplitude was changed to 56.2 V. The white brightness at –56.2 V was 13.1, and the black brightness at +56.2 V was 2.35. After the test at 56.2 V, the display was tested at ±75 V, and the result was brightness in the white state of 13.4 and brightness in the black state of 2.3. Thus, the response at 56.2 V was basically a full response.

For a comparable display without any added electrolyte salt, the voltage had to be 100V or larger to obtain full response.

Test 2: The display was put in a black state with a brightness of 2.79 and left overnight. The next day, a 25 V square wave pulse with a 6 second period was applied to the display. For the –25 V parts of the test, the brightness varied between 2.741 and 2.785. For the +25 V cycles, the brightness varied between 2.72 and 2.741. Thus, there was basically no response at 25 V.

Next, the display was tested at ±50 V. After 4 cycles, the brightness in the white state (–50 V) was 11.5, and the brightness in the black state (+50V) was 2.4. As in Test 1, there was a sharp voltage threshold, and the response of the display was almost at its maximum at a voltage amplitude of 50 V.

Test 3: The display was put in a black state with a brightness of 2.5 and left over a weekend. The following Tuesday, a 25 V square wave pulse with a 6 second period was applied to the display. For the –25 V parts of the test, the brightness varied between 2.545 and 2.567. For the ±25 V cycles, the brightness varied between 2.545 and 2.567. Thus, there was basically no response at 25 V.

Next, the display was tested at ±50 V. After 9 cycles, the brightness in the white state (–50 V) was 9.89, and the brightness in the black state (+50V) was 2.3 to 2.4. The voltage was increased to ±75 V, and the brightness in the white state (–75 V) was 11.55 after 2 cycles. In the black state (+75 V), the brightness was 2.35 to 2.39. Next, the voltage was increased to ±100 V, and the brightness in the white state (−100 V) was 11.2 to 11.57. In the black state (+100 V), the brightness was 2.39 to 2.46.

As in Tests 1 and 2, there is a sharp voltage threshold. However, the response at a voltage amplitude of 50 V was not as close to the full response as it was when the display rested in the black state for only one night. As in the previous tests, full response was attained for a 75 V amplitude.

The above experiments demonstrate that polymer electrolyte materials can be used to improve the performance of Gyricon displays.

Other modifications of the present invention may occur to one of ordinary skill in the art subsequent to a review of the present application, and these modifications, including equivalents, or substantial equivalents thereof, are intended to be included within the scope of the present invention.

I claim:

1. A display media comprising a) a substrate, and b) bichromal beads comprising an electrolyte and a polymer comprising an alkyl poly(alkylene oxide), wherein said bichromal beads are dispersed in said substrate.

2. A display media in accordance with claim 1, wherein said alkyl poly(alkylene oxide) has at least 4 alkylene oxide units per alkyl poly(alkylene oxide) molecule.

3. A display media in accordance with claim 2, wherein said alkyl poly(alkylene oxide) has from about 20 to about 100 alkylene oxide units per alkyl poly(alkylene oxide) molecule.

4. A display media in accordance with claim 1, wherein said alkyl is selected from the group consisting of methyl, ethyl, propyl, butyl, poly(methyl), poly(ethyl), poly(propyl), poly(butyl), poly(ethylene), poly(propylene), and poly(butylene).

5. A display media in accordance with claim 1, wherein said alkyl poly(alkylene oxide) is selected from the group consisting of alkyl poly(alkylene oxide) acetate ester and alkyl poly(alkylene oxide) alcohol.

6. A display media in accordance with claim 1, wherein said alkylene is selected from the group consisting of ethylene, propylene and butylene.

7. A display media in accordance with claim 1, wherein said polymer is present in the bichromal beads in an amount of from about 0.1 to about 50 percent by weight of total solids.

8. A display media in accordance with claim 1, wherein said electrolyte is a salt.

9. A display media in accordance with claim 8, wherein said electrolyte salt is a lithium salt.

10. A display media in accordance with claim 9, wherein said lithium salt is selected from the group consisting of $LiClO_4$, $LiCF_3SO_3$, $LiN(CF_3SO_2)_2$, and $LiN(CF_3CF_2SO_2)_2$.

11. A display media in accordance with claim 1, wherein said electrolyte is present in the bichromal beads in an amount of from about 0.0005 to about 90 weight percent.

12. A display media in accordance with claim 1, wherein said bichromal beads further comprise a small molecule polymer plasticizer.

13. A display media in accordance with claim 12, wherein said small molecule polymer plasticizer is selected from the group consisting of ethylene carbonate, propylene carbonate, N-methyl acetamide, acetonitrile, sulfolane, 1,2-dimethoxyethane, polyethylene glycols, 1,3-dioxolanes, glymes, siloxanes, water, and alcohols.

14. A display media in accordance with claim 1, wherein said bichromal beads further comprise a pigment.

15. A display media in accordance with claim 14, wherein said pigment is selected from the group consisting of carbon black and titanium oxide.

16. A display media in accordance with claim 1, wherein said substrate comprises an elastomer.

17. A display media in accordance with claim 16, wherein said elastomer comprises a polysiloxane.

18. A display media in accordance with claim 16 wherein said elastomer comprises an oil.

19. A display media in accordance with claim 1, wherein said bichromal beads are microencapsulated.

20. A display media comprising a) a substrate, and b) bichromal beads comprising an alkyl poly(alkylene oxide) and a lithium salt, wherein said bichromal beads are dispersed in said substrate.

21. A display apparatus capable of causing an image to be displayed comprising;

i) a display media comprising a) substrate and b) bichromal beads comprising an electrolyte and a polymer comprising an alkyl poly(alkylene oxide), wherein said bichromal beads are dispersed in said substrate; and ii) a means for orienting said bichromal beads in said substrate so as to form an image on said display media.

22. A display apparatus in accordance with claim 21, wherein said alkyl poly(alkylene oxide) has at least 4 alkylene oxide units per alkyl poly(alkylene oxide) molecule.

23. A display apparatus in accordance with claim 22, wherein said alkyl poly(alkylene oxide) has from about 20 to about 100 alkylene oxide units per alkyl poly(alkylene oxide) molecule.

24. A display apparatus in accordance with claim 21, said alkyl is selected from the group consisting of methyl, ethyl, propyl, butyl, poly(methyl), poly(ethyl), poly(propyl), poly(butyl), poly(ethylene), poly(propylene), and poly(butylene).

25. A display apparatus in accordance with claim 21, wherein said alkylene is selected from the group consisting of methylene, ethylene, propylene and butylene.

26. A display apparatus in accordance with claim 21, wherein said electrolyte is a lithium salt.

27. A display apparatus in accordance with claim 26, wherein said lithium salt is selected from the group consisting of $LiClO_4$, $LiCF_3SO_3$, $LiN(CF_3SO_2)_2$, and $LiN(CF_3CF_2SO_2)_2$.

* * * * *